(12) United States Patent
Underwood

(10) Patent No.: US 7,552,508 B2
(45) Date of Patent: Jun. 30, 2009

(54) CASTER ATTACHMENT SYSTEM

(75) Inventor: John R. Underwood, Laguna Niguel, CA (US)

(73) Assignee: Alcon, Inc., Hunenberg (CH)

(*) Notice: Subject to any disclaimer, the term of this patent is extended or adjusted under 35 U.S.C. 154(b) by 354 days.

(21) Appl. No.: 11/435,533

(22) Filed: May 17, 2006

(65) Prior Publication Data

US 2007/0266525 A1 Nov. 22, 2007

(51) Int. Cl.
*B60B 33/00* (2006.01)
(52) U.S. Cl. .......................... 16/31 R; 16/42 T; 16/43; 16/30
(58) Field of Classification Search ............... 16/31 R, 16/31 A, 32, 19, 43, 37–39, 30; 248/519, 248/521, 523, 188.9, 188.91, 188.4, 188.8, 248/188.2; 280/43, 43.14, 43.2, 43.21; 403/377, 403/225–228, 109.1, 109.4, 109.5
See application file for complete search history.

(56) References Cited

U.S. PATENT DOCUMENTS

| | | | | | |
|---|---|---|---|---|---|
| 615,155 | A | * | 11/1898 | George | 16/44 |
| 804,809 | A | * | 11/1905 | Mann et al. | 16/21 |
| 1,061,912 | A | * | 5/1913 | Hilfrank | 16/18 R |
| 1,389,572 | A | * | 9/1921 | Berg | 248/188.4 |
| 1,487,450 | A | * | 3/1924 | Endebrock | 16/21 |
| 1,899,394 | A | * | 2/1933 | Noelting et al. | 16/38 |
| 2,592,942 | A | * | 4/1952 | Moore | 248/184.1 |
| 3,526,921 | A | * | 9/1970 | Aupke | 16/43 |
| 5,742,977 | A | * | 4/1998 | Hoofe, III | 16/30 |
| 6,796,001 | B1 | * | 9/2004 | Finkelstein | 16/32 |
| 6,886,216 | B2 | * | 5/2005 | Graham et al. | 16/42 T |

* cited by examiner

*Primary Examiner*—Chuck Y. Mah
(74) *Attorney, Agent, or Firm*—W. David Lee

(57) ABSTRACT

A caster attachment system includes an upper section and a lower section. The upper section mounts to a piece of equipment. The lower section provides a post for the mounting of a caster. A shaped key on the lower section fits within a receiver socket on the upper portion. The upper section and the lower section are held together by a threadable connection.

4 Claims, 1 Drawing Sheet

CASTER ATTACHMENT SYSTEM

FIELD

Figure 1:
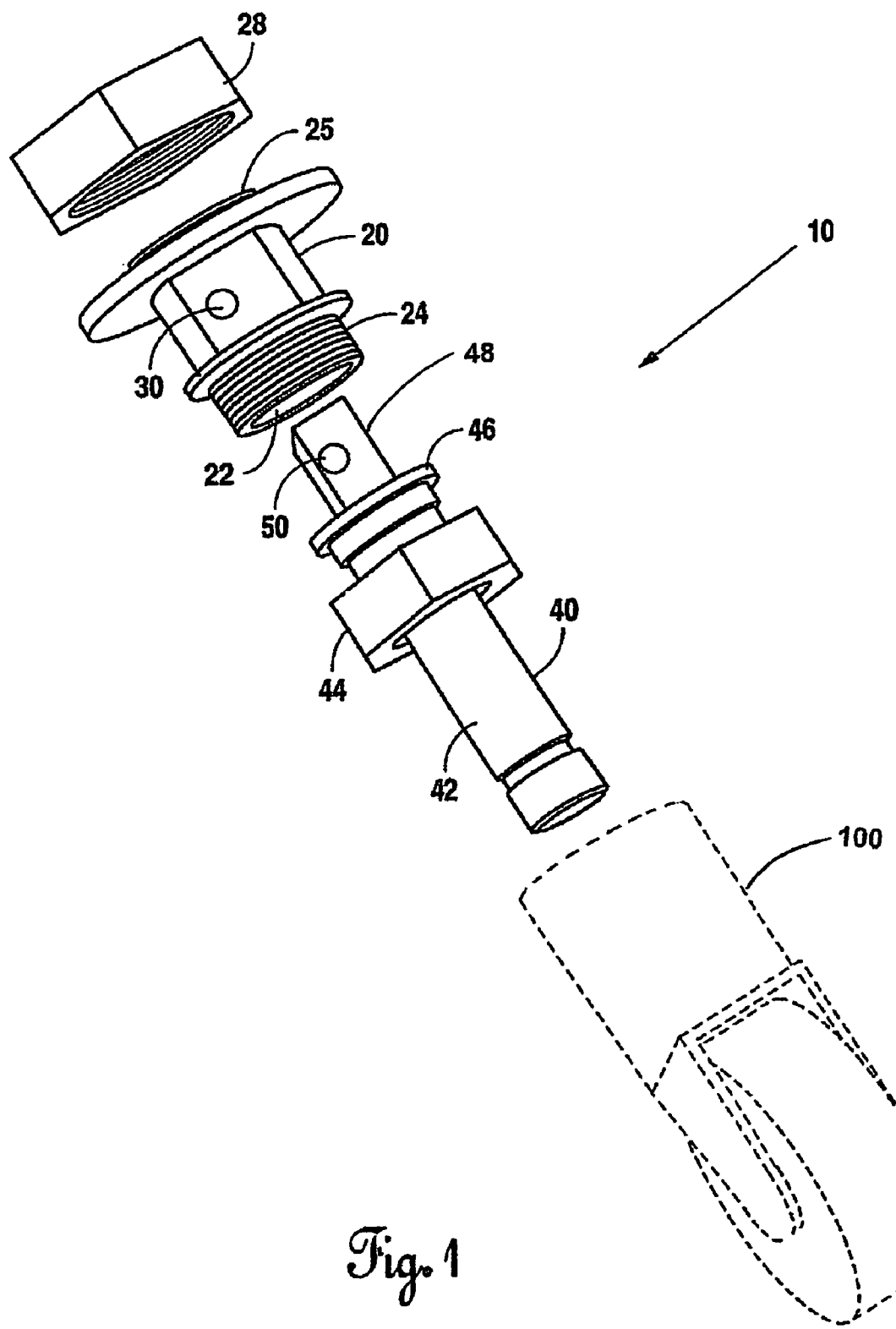

The present invention pertains to casters; more particularly, the present invention pertains to a caster attachment system used with a medical/surgical system such as a vitrectomy system.

BACKGROUND

In prior art medical/surgical systems, the interface between a directional caster and a supported structure was typically done with a keyed caster that extended through the structure and was secured with a locking nut disposed within the system. It has been found that some designs of equipment will not provide sufficient access to secure a caster with a locking nut in this manner. In addition, such a locking nut makes it more difficult for field service personnel to assemble and service equipment at the customer site. There is therefore a need in the art for a caster attachment system that will allow the caster to be easily secured from the outside of the system.

SUMMARY

The disclosed caster attachment system enables a caster to be secured to a piece of equipment from the outside using just a simple wrench.

The disclosed caster attachment system includes an upper section and a lower section. The upper section is connectable to the bottom of a piece of medical/surgical equipment. The upper section further includes a shaped opening formed therein and externally formed threads surrounding the shaped opening.

The lower section includes a caster mounting post. Substantially aligned with the caster mounting post is a shaped key member. A floating nut engages a collar surrounding the shaped key member.

By threadably connecting the floating nut to the externally formed threads on the upper section and tightening the connection with a wrench, the caster is secured to the piece of equipment.

BRIEF DESCRIPTION OF THE DRAWING FIGURE

A better understanding of the caster attachment system of the present invention may be had by reference to the drawing FIGURE, wherein:

FIG. 1 is a perspective view of the disclosed caster attachment system.

DESCRIPTION OF THE EMBODIMENTS

The caster attachment system 10 for use with a medical/surgical system such as a vitrectomy system provides an alternative method for attaching and removing casters 100. The disclosed caster attachment system 10 allows directional locking casters to be secured to the supported structure from the exterior of the medical/surgical system.

As shown in FIG. 1, the attachment fitting used in the disclosed caster attachment system 10 includes two separate portions 20, 40. The first portion 20 is mounted to the bottom exterior of the medical/surgical equipment.

The first or top portion 20 of the caster attachment system 10 includes a receiver socket 22. Surrounding the receiver socket 22 is an externally threaded portion 24 to interface with the floating nut 44 explained below. The receiver socket 22 is secured to the supported piece of medical/surgical equipment with a threaded interface 25 or it can be mounted using nuts 28, bolts, pins, insert molded or a cast in feature. Mating anti-rotation features prevent rotation of the second or lower portion 40 with respect to the upper portion 20. Such features may preferably include a machined key feature wherein the machined key and its mating socket have at least one flat side; a set of pins passing through an aligned set of holes 30, 50; and/or fasteners.

The second or bottom portion 40 of the caster attachment system 10 includes a caster post 42 attached to the caster 100. The caster post or shaft 42 is secured to the upper portion 20 using a captive nut 44. The floating nut 44 is trapped on the caster post 42. The inner diameter of the nut 44 is larger than the outer diameter of the shaft 42. This difference in diameters allows the captive nut 44 to float about shaft 42 and to accommodate any misalignments. A flange 46 is formed around the caster post 42 of the lower portion 40 for contact with the interior of the floating nut 44. Above the flange 46 is the male portion or key 48 which fits into the receiver socket 22.

The disclosed caster attachment system takes up very little space. A simple wrench selected to fit on floating nut 44 is used to couple and decouple the unit from the supported medical/surgical equipment. Those of ordinary skill in the art will understand that the caster attachment system may be accessed from the outside of the supported system and a minimum of parts are used.

As may be seen by the foregoing, a receiver socket 22 is used with an integrated threaded fastening system and a matching keyed pin with a floating nut. The receiver socket portion 22 of the caster attachment system can either be mechanically attached with a nut 28, or the receiver socket 22 can be insert molded. When the two portions 20, 40 of the caster attachment system 10 are joined, the keyed feature controls orientation of the caster 100 and the floating nut 44 secures the joint to create a structurally sound interface with the supported structure. If desired a mechanical lock such as a ball and socket my be used to hold the male key 48 within the receiver socket 22 while the floating nut 44 threadably engages the external thread 24.

While the disclosed invention has been described according to its preferred embodiment, those of ordinary skill in the art will understand that numerous other embodiments have been enabled by the foregoing disclosure. Such other embodiments shall be included within the scope and meaning of the appended claims.

What is claimed is:

1. A caster system for attaching to a medical/surgical system, comprising:
   an upper portion for attachment to a medical/surgical, said upper portion having
      a receiver socket with external threads and an internal bore; and
   a lower portion having:
      a first end with a key constructed and arranged for non-rotational interfitment into said internal bore of said receiver socket;
      a second end with a caster post;
      a flange separating said first end and said second end;
      an internally threaded nut slidaby disposed on said caster post below said flange;
      and
      a caster constructed and arranged for attachment to said caster post;
   whereby when said upper portion and said lower portion are brought together, said key is disposed within said receiver socket and said internally threaded nut threadably engages said external threads on said receiver socket.

2. The caster system as defined in claim 1 wherein said key has a first flat side.

3. The caster system as defined in claim 1 wherein said internal bore of said receiver socket has a second flat side for matting with said first flat side.

4. A method for attaching a caster to a medical/surgical system, said method comprising the stops of:

affixing a receiver socket to a bottom of a medical/surgical system, said receiver socket having external threads and a shaped internal bore;

providing a caster post having a key with a defined external shape on a first end;

inserting said key of said caster post into said shaped internal bore of said receiver socket;

retaining said key within said internal bore via a ball socket lock;

securing said key in said internal bore by threadably engaging a nut slidaby disposed on said caster post to said external threads of said receiver socket; and attaching a caster to a second end of said caster post.

\* \* \* \* \*

UNITED STATES PATENT AND TRADEMARK OFFICE
CERTIFICATE OF CORRECTION

PATENT NO. : 7,552,508 B2 Page 1 of 1
APPLICATION NO. : 11/435533
DATED : June 30, 2009
INVENTOR(S) : Underwood It is certified that error appears in the above-identified patent and that said Letters Patent is hereby corrected as shown below:

Col. 2, ln. 51, after "medical/surgical" insert --system--.
Col. 2, lns. 52-53, after "having" delete hard return and insert a space to combine lines 52 and 53.
Col. 3, ln. 10, delete "stops" and insert --steps--.

Signed and Sealed this

Twenty-fifth Day of August, 2009

David J. Kappos
*Director of the United States Patent and Trademark Office*